US009681171B2

(12) United States Patent
Salman et al.

(10) Patent No.: US 9,681,171 B2
(45) Date of Patent: Jun. 13, 2017

(54) PROVIDING SECOND SCREEN CONTENT BASED ON A FREQUENCY CODE

(71) Applicant: Verizon Patent and Licensing Inc., Basking Ridge, NJ (US)

(72) Inventors: Mohammad Y. Salman, Irving, TX (US); Manah M. Khalil, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 30 days.

(21) Appl. No.: 14/199,564

(22) Filed: Mar. 6, 2014

(65) Prior Publication Data
US 2015/0256876 A1   Sep. 10, 2015

(51) Int. Cl.
*H04N 7/173* (2011.01)
*H04N 21/43* (2011.01)
*H04N 21/462* (2011.01)
*H04N 21/41* (2011.01)
*H04N 21/439* (2011.01)
(Continued)

(52) U.S. Cl.
CPC ..... *H04N 21/4302* (2013.01); *H04N 21/4126* (2013.01); *H04N 21/439* (2013.01); *H04N 21/4622* (2013.01); *H04H 20/93* (2013.01); *H04H 2201/40* (2013.01); *H04H 2201/50* (2013.01); *H04N 21/4347* (2013.01); *H04N 21/8586* (2013.01)

(58) Field of Classification Search
CPC ........... H04N 21/4622; H04N 21/8586; H04H 2201/50; H04H 20/93; H04H 2201/40
See application file for complete search history.

(56) References Cited

U.S. PATENT DOCUMENTS 7,392,312 B1 * 6/2008 Philyaw .................. 709/225
8,401,569 B1 * 3/2013 Bell et al. ................ 455/456.3
(Continued)

FOREIGN PATENT DOCUMENTS

GB      1358355 A  *  7/1974  ............... H04N 5/76

OTHER PUBLICATIONS

Wikipedia, "Second Screen", http://en.wikipedia.org/w/index.php?title=Second_screen&oldid=597335274, Feb. 27, 2014, 5 pages.

(Continued)

*Primary Examiner* — Nathan Flynn
*Assistant Examiner* — James R Marandi

(57) ABSTRACT

A device configured to receive a request, from a server, to provide frequency code information identifying a frequency code. The frequency code includes frequencies to be emitted by a broadcasting device that presents a first content. The device may generate a code based on the request. The device may receive a second content from the server. The device may store the second content and the code so that the second content is associated with the code. The device may generate the frequency code information based on the code. The device may provide the frequency code information for the frequency code to be emitted by the broadcasting device. The device may receive the code from a listening device that detected the frequency code emitted by the broadcasting device. The device may provide the second content associated with the code to the listening device.

20 Claims, 7 Drawing Sheets

(51) Int. Cl.
*H04N 21/858* (2011.01)
*H04H 20/93* (2008.01)
*H04N 21/434* (2011.01)

(56) References Cited

U.S. PATENT DOCUMENTS

2010/0280641 A1* 11/2010 Harkness ............... H04H 20/31
700/94
2012/0295560 A1* 11/2012 Mufti .................... H04B 13/00
455/95

OTHER PUBLICATIONS

Wikipedia, "Shazam (service)" http://en.wikipedia.org/w/index.php?title=Shazam_(service)&oldid=595438809, Feb. 14, 2014, 7 pages.
Wikipedia, "SlickLogin", http://en.wikipedia.org/w/index.php?title=SlickLogin&oldid=595958280, Feb. 18, 2014, 1 page.
Greg Kumparak, "SlickLogin Aims to Kill the Password by Singing Silent Song to your Smartphone", http://techcrunch.com/2013/09/09/slicklogin-wants-to-kill-the-password-by-singing-a-silent-song-to-your-smartphone/, Sep. 9, 2013, 15 pages.

* cited by examiner

PROVIDING SECOND SCREEN CONTENT BASED ON A FREQUENCY CODE

BACKGROUND

Simultaneous use of multiple devices has become common. For example, a person may watch TV and use a smart phone at the same time. Content providers may take advantage of this trend and provide content (e.g., second screen content) on the smart phone that supplements the content being watching on the TV (e.g., first screen content). For example, the smart phone may capture an acoustic fingerprint of the first screen content being played on the TV and receive the second screen content based on the acoustic fingerprint.

DETAILED DESCRIPTION OF PREFERRED EMBODIMENTS

The following detailed description of example implementations refers to the accompanying drawings. The same reference numbers in different drawings may identify the same or similar elements.

Obtaining second screen content using an acoustic fingerprint may be difficult for a user. For example, audio of the first screen content may have to be recorded for 5 to 10 seconds to capture the acoustic fingerprint, which may be frustrating to the user. Moreover, capturing the acoustic fingerprint may be difficult because the recording may be susceptible to ambient noise (e.g., people talking nearby) that may interfere with the audio of the first screen content being recorded.

Implementations described herein may allow a listening device (e.g., a second screen device) to acquire second screen content based on a frequency code added to first screen content that is emitted by a broadcasting device (e.g., a first screen device). The frequency code may have a shorter length than the time required to capture an acoustic fingerprint (e.g., less than one second). In some implementations, the frequency code may include frequencies that are inaudible to people. Thus, people may not be disturbed by the frequency code and detecting the frequency code may not be susceptible to the same ambient noise to which capturing an acoustic fingerprint is susceptible (e.g., audible ambient noise).

Figure 1:
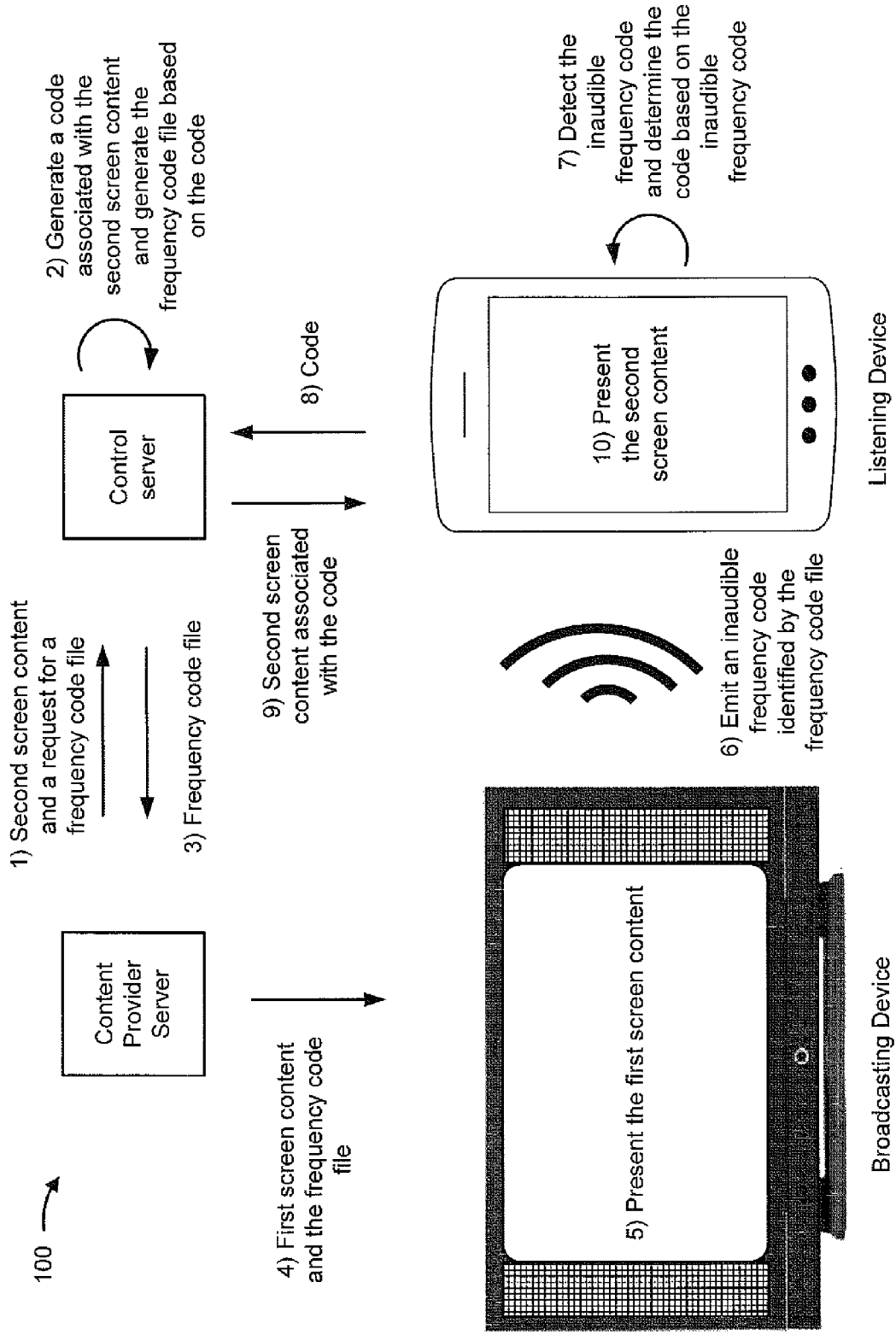
FIG. 1 is a diagram of an overview of an example implementation described herein.

FIG. 1 is a diagram of an overview of an example implementation described herein. As shown in FIG. 1, a content provider server may send second screen content and a request to provide a frequency code file to a control server. The second screen content may include content that supplements first screen content that the content provider server distributes to other devices.

The control server may receive the request and the second screen content. The control server may generate a code associated with the second screen content and store the code and the second screen content in a second screen content data structure. The control server may generate the frequency code file based on the code. The frequency code may indicate an inaudible frequency code including inaudible frequencies to be played though speakers. In some implementations, the frequency code file may be an audio file. The control server may provide the frequency code file to the content provider server and the content provider server may receive the frequency code file.

The content provider server may add the frequency code file associated with the second screen content to first screen content. The content provider server may send the first screen content with the added frequency code file to a broadcasting device (e.g., a TV).

The broadcasting device may receive the first screen content with the added frequency code file. The broadcasting device may present the first screen content and emit the inaudible frequency code indicated by the frequency code file through speakers while the first screen content is presented.

A listening device may detect the inaudible frequency code emitted by the broadcasting device using a microphone. The listening device may determine the code based on the inaudible frequency code. The listening device may send the code to the control server.

The control server may receive the code and retrieve the second screen content associated with the code from the second screen content data structure. The control server may send the second screen content to the listening device. The listening device may receive the second screen content and present the second screen content.

In this way, a listening device (e.g., a second screen device) may acquire second screen content using an inaudible frequency code emitted by a broadcasting device (e.g., a first screen device).

Figure 2:
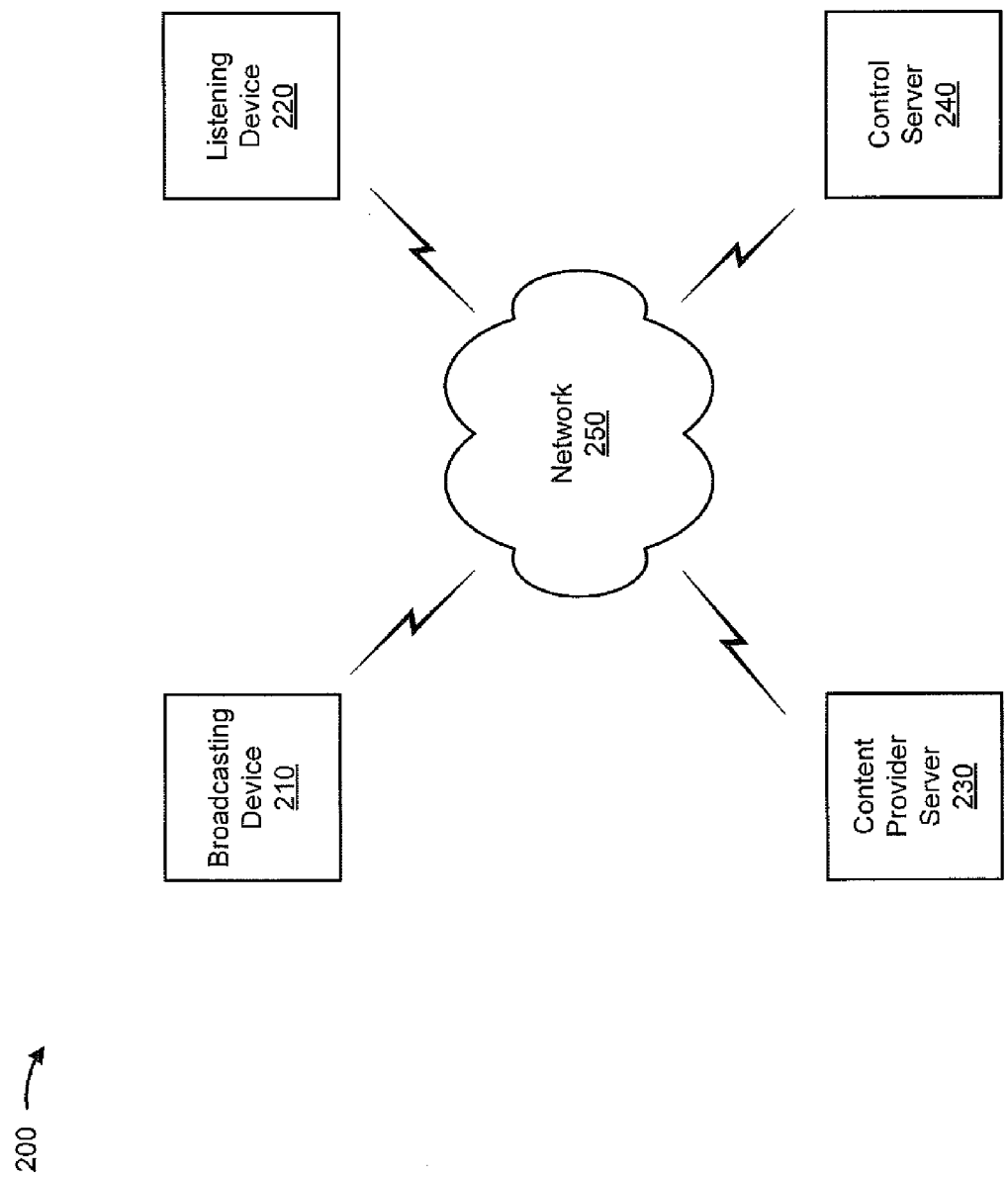
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a broadcasting device 210, a listening device 220, a content provider server 230, a control server 240, and/or a network 250.

Broadcasting device 210 may include a device capable of emitting an audible frequency and/or an inaudible frequency. Broadcasting device 210 may be referred to herein as a "first screen device." Nevertheless, broadcasting device 210 may or may not include a screen (e.g., a display). In some implementations, broadcasting device 210 may include a device capable of receiving, processing, and providing information. For example, broadcasting device 210 may include a mobile phone (e.g., a smart phone, a radiotelephone, etc.), a computing device (e.g., a desktop computer, a laptop computer, a tablet computer, a handheld computer, etc.), a television, a radio, or a similar device. In some implementations, broadcasting device 210 may include a communication interface that allows broadcasting device 210 to receive information from and/or transmit information to other devices in environment 200.

Listening device 220 may include a device capable of detecting an audible frequency and/or an inaudible frequency. Listening device 220 may be referred to herein as a "second screen device." Nevertheless, listening device 220 may or may not include a screen (e.g., a display). In some implementations, listening device 220 may include a device capable of receiving, processing, and providing information. For example, listening device 220 may include a mobile phone (e.g., a smart phone, a radiotelephone, etc.), a computing device (e.g., a desktop computer, a laptop computer, a tablet computer, a handheld computer, etc.), a television, a radio, or a similar device. In some implementations, listening device 220 may include a communication interface that allows listening device 220 to receive information from and/or transmit information to other devices in environment 200.

Content provider server 230 may include one or more devices capable of storing, processing, and/or routing information. In some implementations, content provider server 230 may include a communication interface that allows content provider server 230 to receive information from and/or transmit information to other devices in environment 200.

Control server 240 may include one or more devices capable of storing, processing, and/or routing information. In some implementations, control server 240 may include a communication interface that allows control server 240 to receive information from and/or transmit information to other devices in environment 200.

Network 250 may include one or more wired and/or wireless networks. For example, network 250 may include a cellular network, a public land mobile network ("PLMN"), a second generation ("2G") network, a third generation ("3G") network, a fourth generation ("4G") network, a fifth generation ("5G") network, a long term evolution ("LTE") network, and/or a similar type of network. Additionally, or alternatively, network 250 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a satellite network, a cloud computing network, and/or a combination of these or other types of networks.

The number of devices and/or networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200. Devices of environment 200 may interconnect via wired connections, wireless connections, or a combination of wired and wireless connections.

Figure 3:
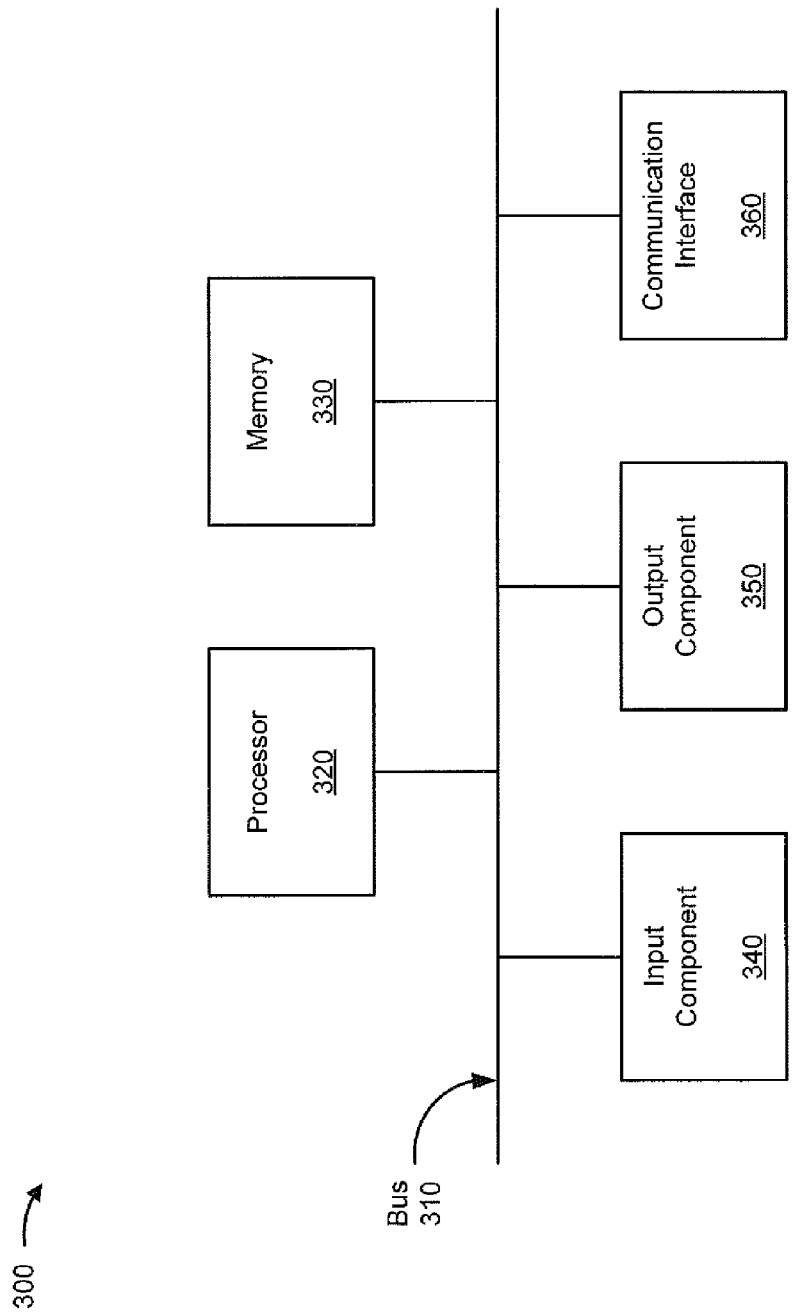
FIG. 3 is a diagram of example components of a device that corresponds to one or more devices of FIG. 2.

FIG. 3 is a diagram of example components of a device 300 that corresponds to one or more devices of FIG. 2. Device 300 may correspond broadcasting device 210, listening device 220, content provider server 230, and/or control server 240. Additionally, or alternatively, broadcasting device 210, listening device 220, content provider server 230, and/or control server 240 may include one or more devices 300 and/or one or more components of device 300.

As illustrated in FIG. 3, device 300 may include a bus 310, a processor 320, a memory 330, an input component 340, an output component 350, and/or a communication interface 360.

Bus 310 may include a path that permits communication among the components of device 300. Processor 320 may include a processor (e.g., a central processing unit, a graphics processing unit, an accelerated processing unit), a microprocessor, and/or another type of processing component (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, a microphone, etc.). Additionally, or alternatively, input component 340 may include a sensor for sensing information.

Output component 350 may include a component that outputs information from device 300 (e.g., a display, a speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium is defined as a non-transitory memory device. A memory device includes memory space within a single storage device or memory space spread across multiple storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4:
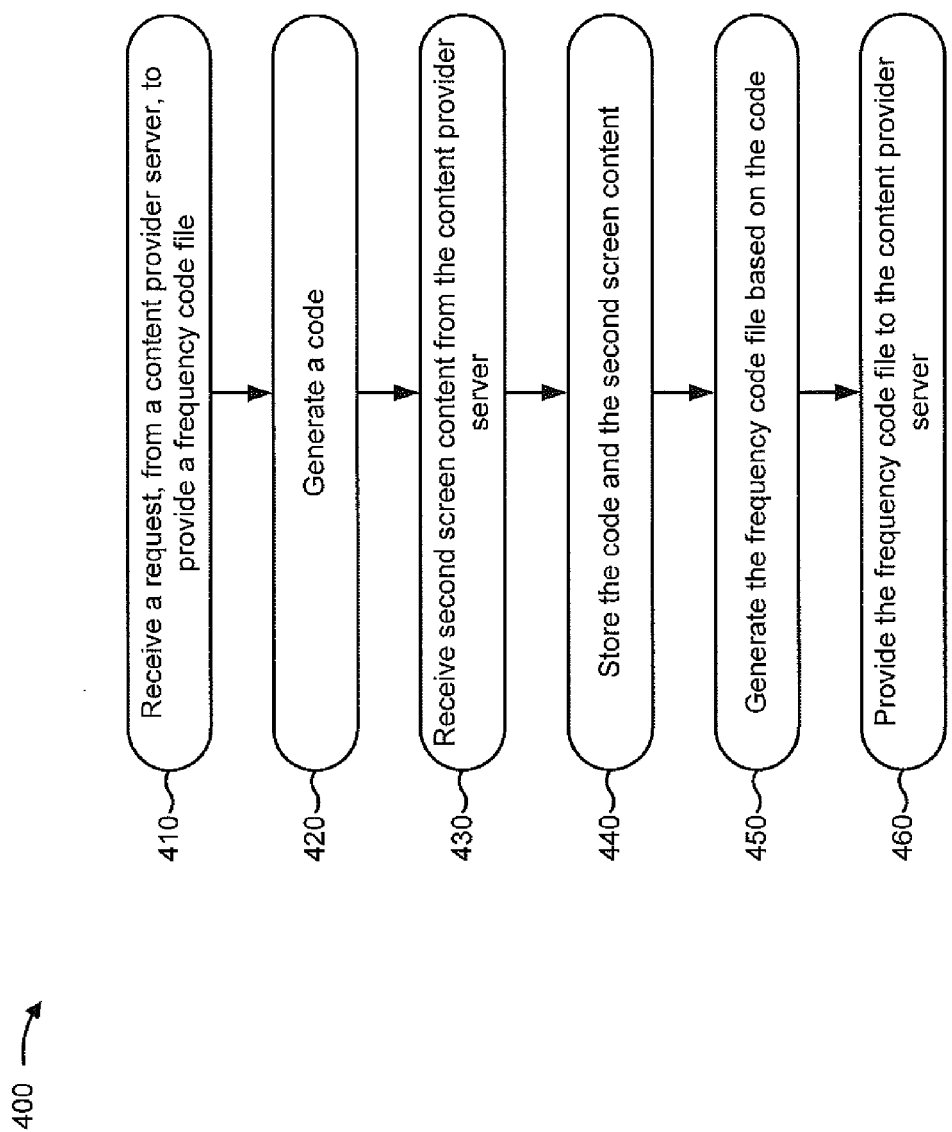
FIG. 4 is a flowchart of an example process for generating a frequency code file identifying a frequency code.

FIG. 4 is a flowchart of an example process 400 for generating a frequency code. In some implementations, one or more process blocks of FIG. 4 may be performed by control server 240. Additionally, or alternatively, one or more process blocks of FIG. 4 may be performed by another device or a group of devices separate from or including control server 240.

As shown in FIG. 4, process 400 may include receiving a request, from content provider server 230, to provide a frequency code file (block 410). For example, control server 240 may receive the request.

A content provider may use content provider server 230 to generate a request to provide a frequency code file. The content provider may be a content owner (e.g., a content producer, a movie studio, etc.), a content provider (e.g., a TV network, a radio network, a website operator, etc.), a service provider (e.g., a cable TV provider, a satellite TV provider, an internet provider, a radio station, a movie theater, etc.), and/or a third party who contracts with a content owner, a content provider, and/or a service provider to include a frequency code file. The content provider server 230 may transmit the request to control server 240 and control server 240 may receive the request.

As further shown in FIG. 4, process 400 may include generating a code (block 420). For example, control server 240 may generate the code based on the request.

The code may be a string of characters of any length. For example, the code may include numbers, letters, symbols, or the like. Control server 240 may use a random character generator (e.g., a random number generator) to generate the code. The code may be unique from any other codes generated by control server 240.

As further shown in FIG. 4, process 400 may include receiving second screen content from content provider server 230 (block 430). For example, control server 240 may receive the second screen content.

Content provider server 230 may send the second screen content that the content provider desires to be accessed using the requested frequency code. Control server 240 may receive the second screen content sent by content provider server 230.

The second screen content may be any kind of content (e.g., an advertisement, an image, a video, and/or a sound that supplements first screen content, etc.). For example, the second screen content may include a video file, an audio file, a text file, and/or any other kind of file. Additionally, or alternatively, the second screen content may include an address identifying a location of a resource (e.g., a uniform resource locator (URL)). The second screen content may correspond to the first screen content that content provider server 230 provides to broadcasting devices 210. For example, the first screen content may include a television program to be played on a TV (e.g., broadcasting device 210). The second screen content may include information about actors in the television program to be displayed on a smart phone or tablet (e.g., listening device 220).

As further shown in FIG. 4, process 400 may include storing the code and the second screen content (block 440). For example, control server 240 may store the code and the second screen content in a second screen content data structure that associates the code with the second screen content. The second screen content data structure may be stored in a memory included in control server 240 and/or in a memory accessibly by control server 240. In some implementations, the second screen content data structure may store metadata for the second screen content (e.g., information about an actor, a rating, a production year, a synopsis, a length, a location, a scene detail, a review, and/or other information about the second screen content). Additionally, or alternatively, the second screen content stored in the second screen content data structure may be a URL.

As further shown in FIG. 4, process 400 may include generating a frequency code file based on the code (block 450). For example, control server 240 may generate the frequency code.

Control server 240 may store a frequency data structure that associates frequency identifiers with all possible characters in a code. For example, a character "0" may be associated with a frequency identifier for 19.0 KHz; a character "1" may be associated with a frequency identifier for 19.1 KHz; etc.

Control server 240 may generate a frequency code file based on the code and the frequency data structure. The frequency code file may identify a frequency code including multiple frequencies. For example, the frequency code file may include the frequency identifiers that are associated with the characters included in the code. The sequence of the frequency identifiers may indicate the frequency code. In other words, the frequency code file may be an audio file that may be played to emit the frequency code identified by the frequency identifiers. The frequency code file may indicate a length of time each frequency should be played (e.g., 1 millisecond, 2 milliseconds, etc.).

The order of the frequencies in the frequency code identified by the frequency code file may correspond to an order of the characters included in the code. For example, a first frequency in the frequency code may be associated with a first character included in the code, and a second frequency in the frequency code may be associated with a second character included in the code.

Additionally, or alternatively, the frequency code identified by the frequency code file may include a start frequency at the beginning of the frequency code indicating the start of the frequency code, and an end frequency at the end of the frequency code indicating the end of the frequency code. The start frequency and the end frequency may be a same frequency or different frequencies. The frequency code may indicate a length of time that each of the start frequency and the end frequency should be played (e.g., 1 millisecond (ms), 2 ms, etc.). The start frequency and the end frequency may have a same length of time or a different length of time. Additionally, or alternatively, the frequency code identified by the frequency code file may include pairing and/or checksum frequencies.

In some implementations, a total time length of the frequency code may be less than one second. For example, assume the frequency code includes a start frequency played for 3 ms, 32 frequencies associated with characters in the code that are each played for 1 ms, and an end frequency played for 3 ms. Thus, the total time length of the frequency code may be 38 ms. On the other hand, a total time length of the frequency code may be greater than one second. For example, assume the frequency code includes a start frequency played for 0.3 seconds, 16 frequencies associated with characters in the code that are each played for 0.1 seconds, and an end frequency played for 0.3 seconds. Thus, the total time length of the frequency code may be 2.2 seconds.

The frequencies included in the frequency code identified by the frequency code file may be inaudible to people. As used herein, the terms "inaudible," "inaudible frequency," or the like refer to a frequency outside of a range of frequencies from 25 Hz to 15 KHz (e.g., outside a range of frequencies detectable by the human ear).

In some implementations, the frequencies included in the frequency code identified by the frequency code file may be higher than audible frequencies and a minimum frequency in the frequency code may be greater than 15 KHz. For example, a minimum frequency included in the frequency code may be 16 KHz, 18 KHz, 20 KHz, 22 KHz, etc. In some implementations, the frequencies included in the frequency code may be lower than audible frequencies and a maximum frequency included in the frequency code may be less than 25 Hz. For example, a maximum frequency included in the frequency code may be 24 Hz, 22 Hz, 20 Hz, 18 Hz, etc. Additionally, or alternatively, one or more of the frequencies included in the frequency code may within the range of frequencies detectable by the human ear (e.g., within the range of 25 Hz to 15 KHz).

As further shown in FIG. 4, process 400 may include providing the frequency code file to content provider server 230 (block 460). For example, control server 240 may provide the frequency code file by sending the frequency code file to content provider server 230. Content provider server 230 may receive the frequency code file and store the frequency code file in a memory included in content provider server 230 and/or accessible by content provider server 230.

While a series of blocks has been described with regard to FIG. 4, the blocks and/or the order of the blocks may be modified in some implementations. Additionally, or alternatively, non-dependent blocks may be performed in parallel.

Figure 5:
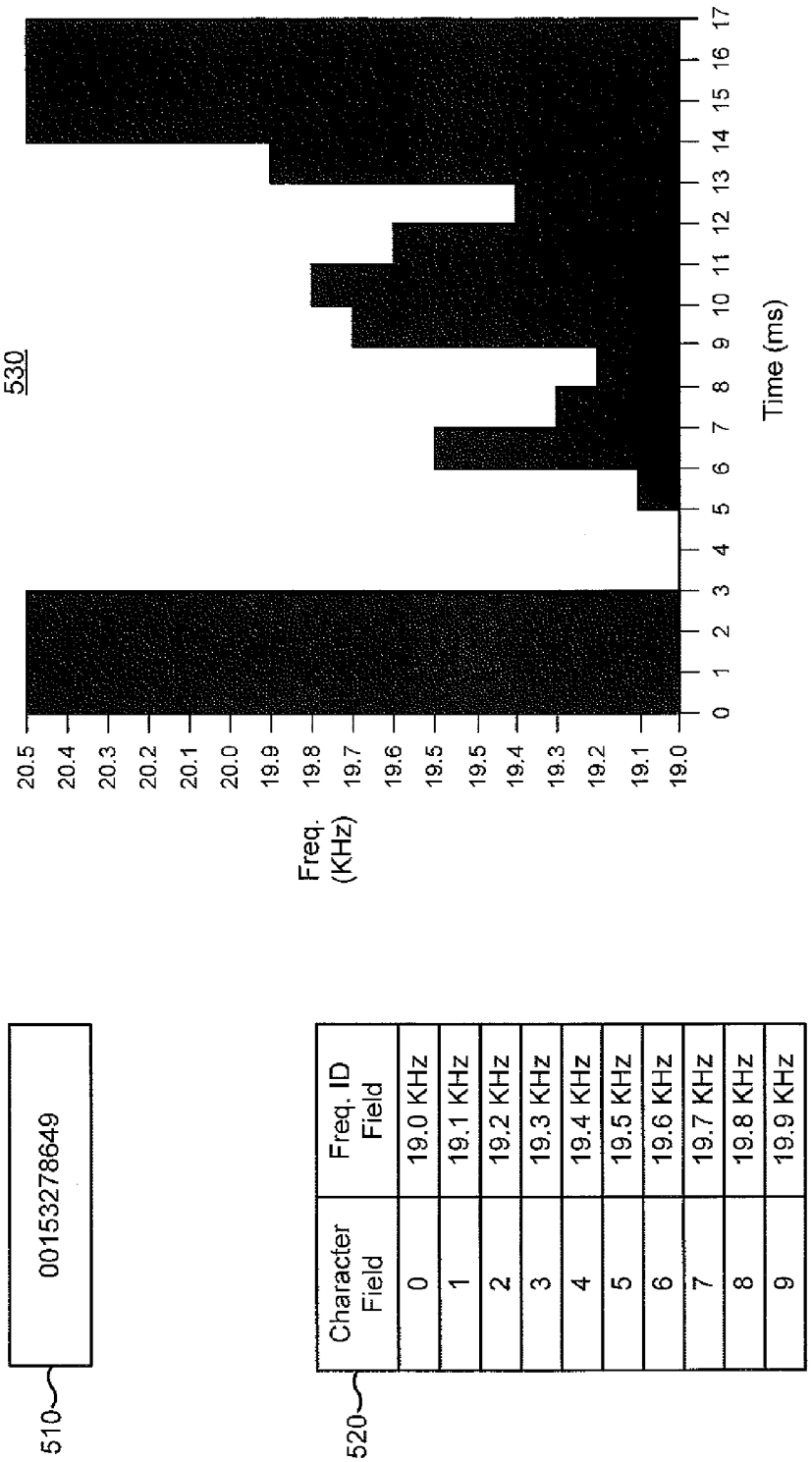
FIG. 5 is a diagram of an example implementation relating to the process shown in FIG. 4.

FIG. 5 is a diagram of an example implementation 500 relating to process 400 shown in FIG. 4. In example implementation 500, assume content provider server 230 sends a request to control server 240 to provide a frequency code file. Further, assume control server 240 receives the request and generates a code 510 based on the request. Code 510 may be a string of numbers (e.g., characters) from 0 to 9. As shown in FIG. 5, assume that code 510 is "00153278649." Further, assume content provider server 230 sends second screen content (e.g., a URL) to control server 240. Control server 240 may receive the second screen content and store the second screen content and code 510 in a second screen content data structure.

Assume control server 240 stores a frequency data structure 520. As shown in FIG. 5, frequency data structure 520 may include a character field and a frequency identifier field that may associate a character of the code (e.g., 0 to 9) with a frequency identifier. For example, a character "0" may be associated with a frequency identifier for 19.0 KHz; a character "1" may be associated with a frequency identifier for 19.1 KHz; etc.

Control server 240 may generate a frequency code file indicating a frequency code 530 based on the code 510 and frequency data structure 520. As shown in FIG. 5, frequency code 530 may begin with a start frequency of 20.5 KHz that is played for the first 3 ms. The start frequency may be followed by a frequency of 19.0 KHz (associated with "0" in code 510) that is played for the next 1 ms; which is followed by a frequency of 19.0 KHz (associated with "0" in code 510) that is played for the next 1 ms; which is followed by a frequency of 19.1 KHz (associated with "1" in code 510) that is played for the next 1 ms; which is followed by a frequency of 19.5 KHz (associated with "5" in code 510) that is played for the next 1 ms; which is followed by a frequency of 19.3 KHz (associated with "3" in code 510) that is played for the next 1 ms; which is followed by a frequency of 19.2 KHz (associated with "2" in code 510) that is played for the next 1 ms; which is followed by a frequency of 19.7 KHz (associated with "7" in code 510) that is played for the next 1 ms; which is followed by a frequency of 19.8 KHz (associated with "8" in code 510) that is played for the next 1 ms; which is followed by a frequency of 19.6 KHz (associated with "6" in code 510) that is played for the next 1 ms; which is followed by a frequency of 19.4 KHz (associated with "4" in code 510) that is played for the next 1 ms; which is followed by a frequency of 19.9 KHz (associated with "9" in code 510) that is played for the next 1 ms. Frequency code 530 may end with an end frequency of 20.5 KHz that is played for the last 3 ms. Control server 240 may send the frequency code file indicating the frequency code 530 to content provider server 230 in response to the request, and content provider server 230 may receive the frequency code file.

As indicated above, FIG. 5 is provided merely as an example. Other examples of codes, frequency data structures, and frequency codes are possible and may differ from what was described with regard to FIG. 5.

Figure 6:
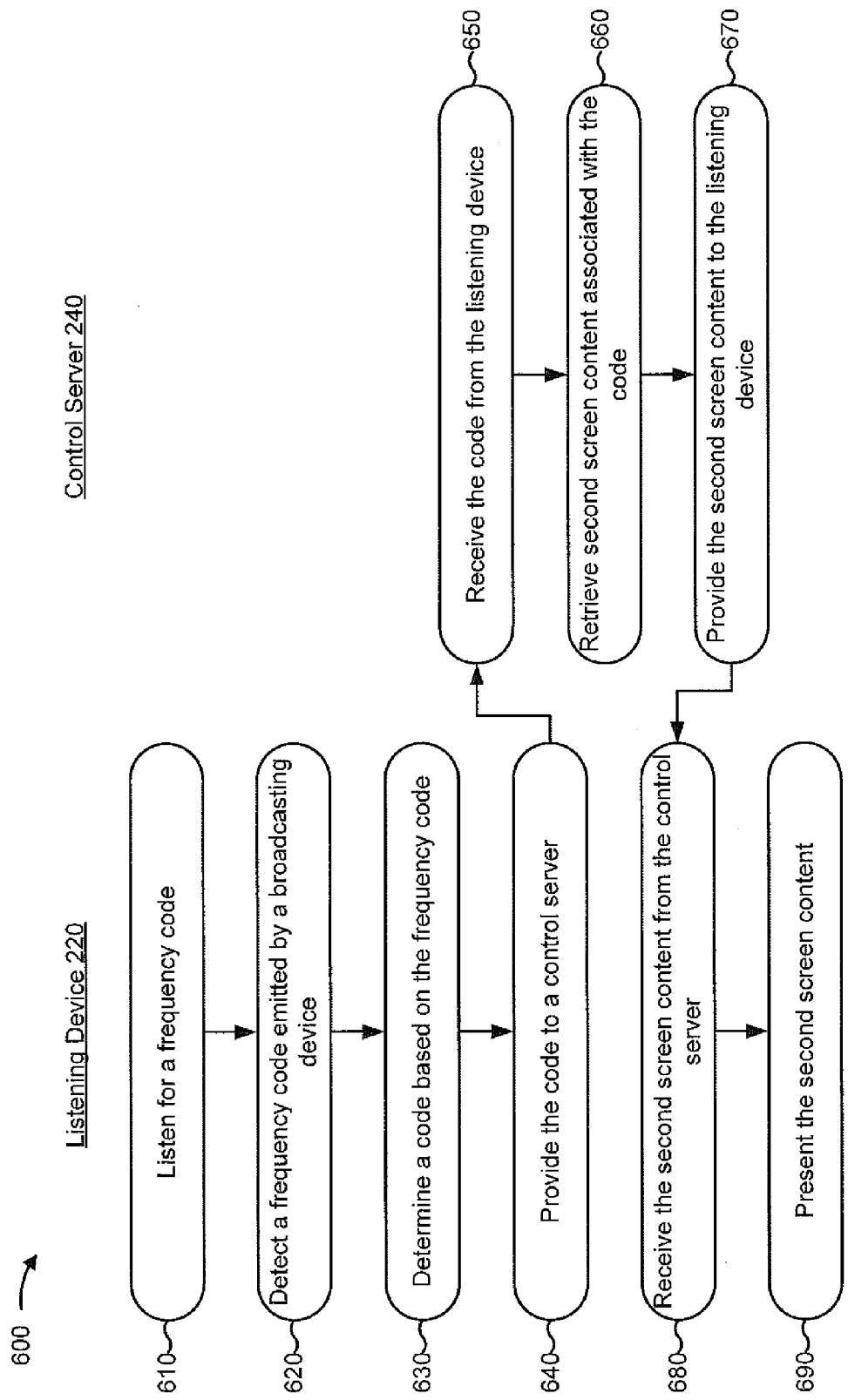
FIG. 6 is a flowchart of an example process for providing second screen content based on a frequency code.

FIG. 6 is a flowchart of an example process 600 for providing second screen content based on a frequency code. In some implementations, one or more process blocks of FIG. 6 may be performed by listening device 220 and/or control server 240. Additionally, or alternatively, one or more process blocks of FIG. 6 may be performed by another device or a group of devices separate from or including listening device 220 and/or control server 240.

As shown in FIG. 6, process 600 may include listening for a frequency code (block 610). For example, listening device 220 may listen for the frequency code.

Content provider server 230 may store first screen content that is to be provided to broadcasting devices 210. The first screen content may include any kind of audio and/or video content. For example, the first screen content may include a TV show, a movie, a radio program, a podcast, a webpage (with or without sound), etc. Content provider server 230 may add one or more frequency code files (e.g., the frequency code file provided at block 460 in FIG. 4) to the first screen content. For example, content provider server 230 may add a frequencies code file to the first screen content by combining the first screen content and the frequency code file using a combiner (e.g., a multiplexer). Additionally, or alternatively, content provider server 230 may add a frequency code file to the first screen content by associating the first screen content and the frequency code file so as to be provided together. In some implementations, content provider server 230 may add a frequency code file, associated with a second screen content, to a first screen content with which the second screen content is associated. For example, content provider server 230 may add a frequency code file, associated with information about actors in a TV show, to the TV show. In some implementations, the content provider may specify a time in the first screen content that the frequency code identified by the frequency code file should be emitted. Additionally, or alternatively, content provider server 230 may add multiple frequency code files to the first screen content (e.g., a single TV show) that are to be emitted at different times.

Content provider server 230 may provide the first screen content with the added frequency code file to broadcasting device 210 via network 250. Broadcasting device 210 may receive the first screen content with the added frequency code file. In some implementations, if content provider server 230 did not combine the first screen content and the frequency code file, broadcasting device 210 may combine the first screen content and the frequency code file using a combiner (e.g., a multiplexer) and/or combine the frequency code file with other first screen content provided by the content provider server 230 (e.g., other first screen content to be presented on a same channel). In this way, the frequency code file may be first screen content specific and/or content provider specific. Broadcasting device 210 may present the first screen content with the added frequency code file. For example, broadcasting device 210 may emit the frequency code identified by the frequency code file through speakers.

Listening device 220 may have an application installed thereon for detecting frequency codes. A user of listening device 220 may execute the application and the application may cause listening device 220 to start listening for frequency codes. Listening device 220 may listen for frequency codes by monitoring a range of frequencies that may be included in the frequency code (e.g., inaudible frequencies). For instance, if control server 240 generates frequency code files identifying frequency codes including frequencies between 19.0 KHz and 20.5 KHz as shown in FIG. 5, the application may be configured to cause listening device 220 to listen for frequencies between 19.0 KHz and 20.5 KHz. Listening device 220 may use the Goertzel algorithm to limit listening to inaudible frequencies. In such cases, limiting listening to inaudible frequencies may provide more privacy to a user of listening device 220 than listening to audible frequencies (e.g., as done when detecting an acoustic fingerprint).

In some implementations, listening device 220 may listen for a frequency code by listening for a start frequency of a frequency code.

As further shown in FIG. 6, process 600 may include detecting a frequency code emitted by broadcasting device 210 (block 620). For example, listening device 220 may detect the frequency code while listening for frequency codes.

Listening device 220 may detect the frequency code by detecting a start frequency for a certain amount of time (e.g., 3 ms, 5 ms, etc.). After the certain amount of time, listening device 220 may detect multiple frequencies at a certain time interval (e.g. 1 ms, 2 ms, etc.) until an end frequency is detected for a certain amount of time. Listening device 220 may generate frequency identifiers based on the frequencies detected between the start frequency and the end frequency. The frequency identifiers may identify the frequencies detected between the start frequency and the end frequency. In some implementations, the frequency identifiers may be associated with a time detected and/or an order detected.

As further shown in FIG. 6, process 600 may include determining a code based on the frequency code (block 630). For example, listening device 220 may determine the code.

Listening device 220 may store, in a memory of listening device 220, the frequency data structure that associates frequency identifiers with all possible characters in a code. For example, the frequency data structure may be included in the application installed on listening device 220. Additionally, or alternatively, listening device 220 may have access to the frequency data structure via network 250 that is stored in a memory of another device in environment 200.

Listening device 220 may determine the code based on the frequency data structure and the frequency identifiers determined at block 620. The code may include the characters associated with the frequency identifiers in a same order that the frequencies identified by the frequency identifiers were detected at block 620. For example, a first character included in the code may be associated with a frequency identifier for a first frequency detected after the start frequency in the frequency code, and a second character included in the code may be associated with a frequency identifier for a second frequency detected after the start frequency in the frequency code.

As further shown in FIG. 6, process 600 may include providing the code to control server 240 (block 640). For example, listening device 220 may provide the code by sending the code to control server 240 via network 250.

As further shown in FIG. 6, process 600 may include receiving the code from listening device 220 (block 650). For example, control server 240 may receive the code sent by listening device 220 via network 250.

As further shown in FIG. 6, process 600 may include retrieving second screen content associated with the code (block 660). For example, control server 240 may retrieve the second screen content by querying the second screen content data structure using the received code and obtaining the second screen content associated with the code.

In some implementations, control server 240 may store a record associating the retrieved second screen content and a listening device ID that identifies listening device 220. The record may be updated to indicate second screen content associated with new codes received from listening device 220. Control server 240 may provide recommendations for first screen content, second screen content, and/or other content to listening device 220 based on the record. Additionally, or alternatively, control server 240 may store a record indicating how many times and/or how often second screen content is retrieved to be sent to listening device 220. In some implementations, control server 240 may send the record to content provider server 230, and content provider server 230 may use the record to identify which second screen content is being sent to listening devices 220. Additionally, or alternatively, the records may be used to measure an audience (e.g., a number of views and/or listeners of the first screen content) of the first screen content that is supplemented by the second screen content. For example, control server 240 may generate a record indicating that a second screen content was sent to ten thousand listening devices 220. Control server 240 and/or another device may extrapolate the ten thousand listening devices 220 to determine 5 million people viewed the first screen content that was supplemented by the second screen content. Furthermore, based on the listening device IDs of listening devices 220 that were sent the second screen content and user profiles associated with the listening device IDs, demographic information about the audience may be determined. For example, the demographic information may indicate a breakdown of the age, the gender, and/or the geographic location of the audience.

As further shown in FIG. 6, process 600 may include providing the second screen content to listening device 220 (block 670). For example, control server 240 may provide the second screen content by sending the second screen content, or a URL for obtaining the second screen content, to listening device 220 via network 250.

As further shown in FIG. 6, process 600 may include receiving the second screen content from control server 240 (block 680). For example, listening device 220 may receive the second screen content sent by control server 240 via network 250.

As further shown in FIG. 6, process 600 may include presenting the second screen content (block 690). For example, listening device 220 may present the second screen content to a user of listening device 220.

Listening device 220 may present the second screen content by displaying the second screen content on a display included in, or associated with, listening device 220 (e.g., displaying video, text, or other media). Additionally, or alternatively, listening device 220 may present the second screen content by emitting sound via speakers included in, or associated with, listening device 220.

In some implementations, the second screen content may include an address identifying a location of a resource (e.g., a URL). Listening device 220 may prompt the user that a resource is available. The user may input an instruction into listening device 220 to obtain the resource based on the prompt and listening device 220 may obtain the resource using the address. Listening device 220 may present the obtained resource. Additionally, or alternatively, listening device 220 may automatically obtain the resource based on the address included in the second screen content and present the resource to the user.

Although broadcasting device 210 and listening device 220 have been described as separate devices in process 600, in some implementations, broadcasting device 210 and listening device 220 may be the same device. For example, a device may receive the first screen content with the added frequency code file from content provider server 230. The device may present the first screen content on a first part of a display and emit the frequency code identified by the frequency code file through speakers of the device. A microphone of the device may detect the frequency code emitted though the speakers, and the device may determine the code based on the frequency code. The device may send the code to control server 240 and control server 240 may receive the code. Control server 240 may send the second screen content associated with the code to the device and the device may receive the second screen content. The device may present the second screen content on a second part of the display while the first screen content is presented on the first part of the display. Accordingly, broadcasting device 210 and listening device 220 may be the same device.

Although implementations have been described where listening device 220 determines a code based on the detected frequency code, in some implementations, listening device 220 may determine the second screen content itself from the detected frequency code. For example, the second screen content itself may be string of characters that may be represented by the frequency code (e.g., a name of a song, a name of an artist, a name of an album, a name of a program, a year, a name of an actor, a URL, etc.). Control server 240 may generate a frequency code file associated with the string of characters that make up the second screen content and provide the frequency code file to broadcasting device 210. In some implementations, a start frequency and an end frequency for a frequency code representing second screen content itself may be different than a start frequency and an end frequency representing a code used to obtain the second screen content. Broadcasting device 210 may receive the frequency code file and emit the frequency code based on the frequency code file. Listening device 220 may detect the frequency code and determine a string of characters (e.g., a name of a song) based on the frequency code. Listening device 220 may present the string of characters (e.g., the second screen content) by displaying the string of characters on a screen. In this way, listening device 220 may present second screen content without needing to send a code to control server 240. Additionally, or alternatively, broadcasting device 210 may detect the emitted frequency code (e.g., via a microphone and/or by measuring voltage variances used to emit sound waves). Broadcasting device 210 may determine the second screen content from the detected frequency code and present the second screen content (e.g., a radio may display an artist name).

In some implementations, listening device 220 may receive second screen content by sending a request to control server 240 for second screen content associated with certain metadata. For example, listening device 220 may send a request requesting second screen content associated with certain metadata (e.g., an actor's name). Control server 240 may receive the request and search the second screen content data structure or a content available on network 250 (e.g., the Internet) for second screen content associated with the certain metadata. Control server 240 may obtain one or more pieces of second screen content associated with the certain metadata and send the second screen content to listening device 220. Listening device 220 may receive the second screen content and present the second screen content.

In some implementations, broadcasting device 210 may not be capable of emitting the frequency code and/or may filter out the frequency code from being emitted. For example, inaudible frequencies included in the frequency code may be outside the range of frequencies that a speaker in broadcasting device 210 is capable of emitting. Additionally, or alternatively, listening device 220 may not be capable of detecting the frequency code. For example, inaudible frequencies included in the frequency code may be outside the range of frequencies that a microphone in listening device 220 is capable of detecting.

In such cases, when control server 240 receives the second screen content from control server 240 at block 430 of FIG. 4, control server 240 may also receive first screen content information from content provider server 230 that identifies a first screen content associated with the second screen content. The first screen content information may identify a broadcast time and/or broadcast address (e.g., a TV channel, a radio channel, etc.) that content provider server 230 will provide the first screen content to broadcast devices 210 to be presented. Based on the first screen content information, control server 240 may listen to the first screen content presented by a broadcasting device 210 and record a particular amount of time of the first screen content (e.g., 5 seconds, 10 seconds, etc.). At the same time, control server 240 may send a command to listening device 220 to start recording audible frequencies for the particular amount of time. If listening device 220 is locked or in an idle state, control server 240 may send a push notification (based on a user preference set up in advance for listening device 220) to wake up listening device 220 and to start an application for recording audible frequencies. Listening device 220 may receive the command and record audible frequencies for the particular amount of time based on the command. After the particular amount of time has passed, control server 240 may generate one or more acoustic fingerprints for a part of the recorded first screen content (e.g., one second of the recorded first screen content, two seconds of the recorded first screen content, etc.). Each acoustic fingerprint may be a digital representation of an audio signal of the part of the recorded first screen content.

Control server 240 may send the one or more acoustic fingerprints to listening device 220 and listening device 220 may receive the one or more acoustic fingerprints. Listening device 220 may determine whether any of the acoustic fingerprints match the audible frequencies recorded by listening device 220. For example, there may be a match if listening device 220 was listening to the first screen content during the particular amount of time and there may not be match if listening device 220 was not listening to the first screen content during the particular amount of time. Listening device 220 may send a response to control server 240 indicating whether any of the acoustic fingerprints match the audible frequencies recorded by listening device 220. Additionally, or alternatively, listening device 220 may send recording information to control server 240 that indicates the audible frequencies recorded by listening device 220 during the particular amount of time. Control server 240 may receive the recording information and determine whether any of the acoustic fingerprints match the audible frequencies recorded by listening device 220. If it is determined that any of the acoustic fingerprints match the audible frequencies recorded by listening device 220, control server 240 may send the second screen content associated with the first screen content to listening device 220 and/or send the code associated with the second screen content to listening device 220, which listening device 220 may use to receive the second screen content as described in blocks 640 to 680 of FIG. 6. Listening device 220 may present the received second screen content as described in block 690 of FIG. 6.

Figure 7:
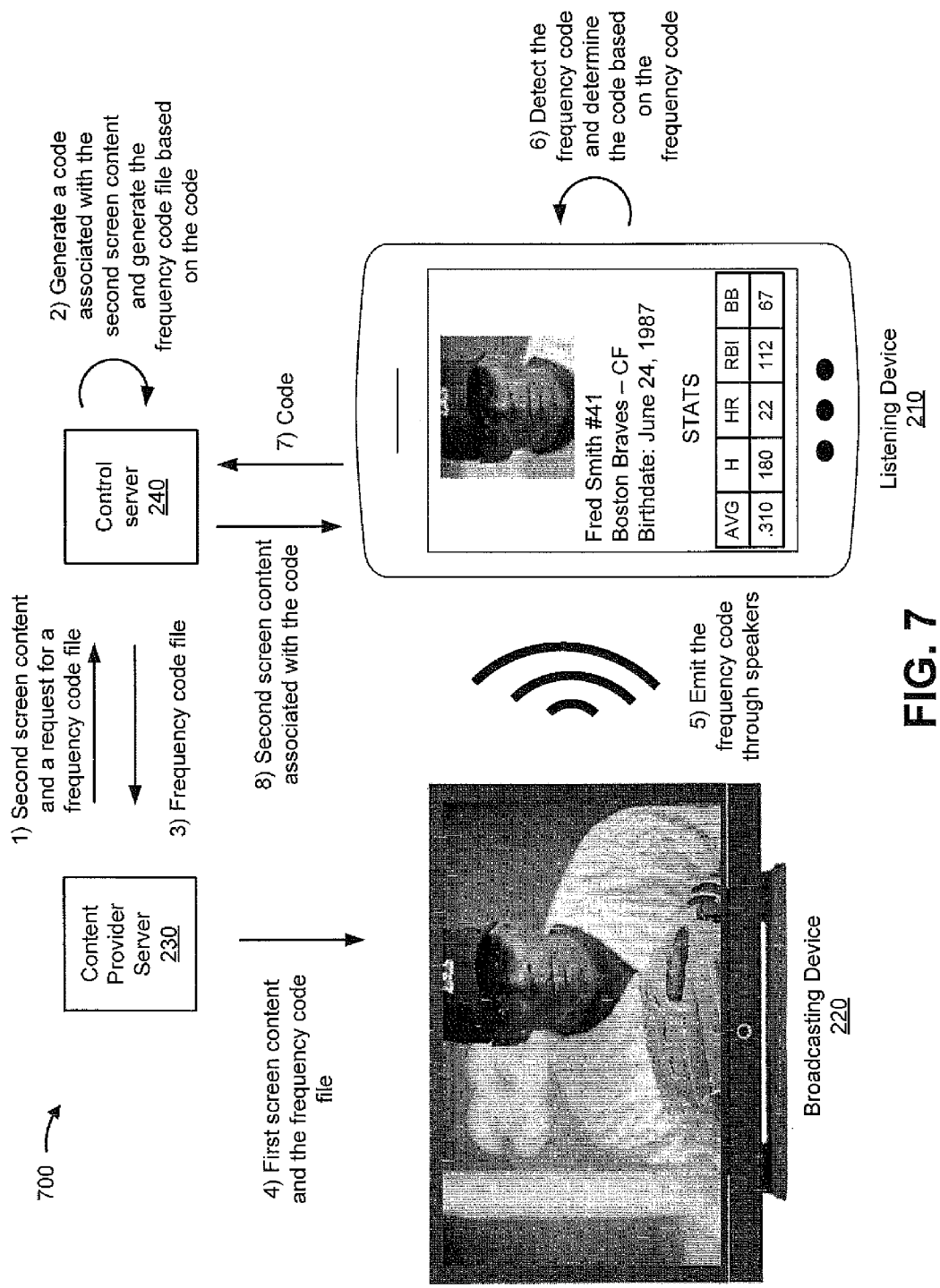
FIG. 7 is a diagram of an example implementation relating to the process shown in FIG. 6.

FIG. 7 is a diagram of an example implementation 700 relating to process 600 shown in FIG. 6. In example implementation 700, content provider server 230 may send second screen content and a request to provide a frequency code file to control server 240. The second screen content may include a picture of Fred Smith (e.g., a baseball player), information about Fred Smith (e.g., a team name, a number, a birthdate), and stats for Fred Smith (e.g., batting average (AVG), hits (H), home runs (HR), runs batted in (RBI), and walks (BB)).

Control server 240 may receive the request and the second screen content. Control server 240 may generate a code associated with the second screen content and store the code and the second screen content in a second screen content data structure. Control server 240 may generate a frequency code file indicating a frequency code based on the code and provide the frequency code file to content provider server 230. In some implementations, the frequency code file may indicate a frequency code including inaudible frequencies. Content provider server 230 may receive the frequency code file.

Assume content provider server 230 sends a broadcast of a baseball game (e.g., first screen content) to broadcasting device 210 (e.g., a TV). During the broadcast of the baseball game, a content provider may desire to have the second screen content provided to a viewer of the baseball game. Accordingly, the content provider may use content provider server 230 to add the frequency code file associated with the second screen content to the broadcast of the baseball game. The content provider may specify a time the frequency code identified by the frequency code file should be emitted during the broadcast of the baseball game. For example, during a live event, such as the baseball game, the content provider may choose in real time a time when Fred Smith appears in the baseball game to have the frequency code emitted.

Broadcasting device 210 may receive the broadcast of the baseball game and the frequency code file. As shown in FIG. 7, broadcasting device 210 may play the broadcast of the baseball game and emit the frequency code at the time specified by the content provider and/or at the time received from content provider server 230.

A viewer of the baseball game on broadcasting device 210 may also be using a listening device 220 (e.g., a smart phone). The viewer may activate an application on listening device 220 that causes listening device 220 to start listening for frequency codes. Listening device 220 may detect the frequency code emitted by broadcasting device 210 and determine a code based on the frequency code. Listening device 220 may send the code to control server 240.

Control server 240 may receive the code and retrieve the second screen content associated with the code from the second screen content data structure. Control server 240 may send the second screen content to listening device 220.

Listening device 220 may receive the second screen content and present the second screen content for display. For example, listening device 220 may display the picture of Fred Smith, the information about Fred Smith, and the stats for Fred Smith.

In some implementations, more than one frequency code file may be added to the broadcast of the baseball game. For example, another frequency code file may be added to the broadcast of the baseball game that identifies another frequency code that causes listening device 220 to receive and present a different second screen content (e.g., information on a different baseball player). Accordingly, content provider server 230 is not limited to only associating one second screen content with the broadcast of the baseball game.

In this way, a listening device 220 may acquire second screen content based on a frequency code emitted by broadcasting device 210.

As indicated above, FIG. 7 is provided merely as an example. Other examples are possible and may differ from what was described with regard to FIG. 7.

Implementations described herein may allow a listening device to acquire second screen content based on a frequency code added to first screen content and emitted by a broadcasting device. In some implementations, the frequency code may include frequencies that are inaudible to people. Thus, people may not be disturbed by the frequency code and detecting the frequency code may not be susceptible to audible ambient noise.

The foregoing disclosure provides illustration and description, but is not intended to be exhaustive or to limit the implementations to the precise form disclosed. Modifications and variations are possible in light of the above disclosure or may be acquired from practice of the implementations.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

As used herein, the term "component" is intended to be broadly construed as hardware, firmware, or a combination of hardware and software.

Certain user interfaces have been described herein. In some implementations, the user interfaces may be customizable by a user or a device. Additionally, or alternatively, the user interfaces may be pre-configured to a standard configuration, a specific configuration based on a type of device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be an open-ended terms. Further, the phrase "based on" is intended to mean "based, at least in part, on" unless explicitly stated otherwise.

What is claimed is:

1. A first server comprising:
   one or more processors to:
      receive a request, from a second server, to provide frequency code information identifying a frequency code,
         the frequency code including information identifying frequencies to be emitted by a broadcasting device that presents a first content,
         the frequency code including information identifying a start frequency indicating a start of the frequency code and information identifying an end frequency indicating an end of the frequency code, and
         the request being received with a second content from the second server,
            the second content being associated with the first content;
      generate, based on the request, a code associated with the second content,
         the code including one or more characters, and
         the code to be used to retrieve the second content;
      store the second content and the code;
      generate the frequency code information based on the one or more characters, included in the code, and a data structure stored by the first server,
         the data structure storing different characters in association with different frequencies,
         each character, of the different characters, being associated with a respective frequency of the different frequencies,
         the start frequency and the end frequency each being different from the different frequencies associated with the different characters, and
         the start frequency and the end frequency being different than another start frequency and another end frequency,
            the other start frequency and the other end frequency being associated with another frequency code representing another second content;
      provide, to the second server, the frequency code information for the frequency code to be emitted by the broadcasting device,
         the second server providing the first content with the frequency code information for the frequency code to the broadcasting device,
         the frequency code information including:
            the start frequency,
            the end frequency, and
            the code to be used to retrieve the second content,
         the broadcasting device to emit the frequency code while presenting the first content;
      receive the code from a listening device that detected the frequency code emitted by the broadcasting device; and
      provide the second content associated with the code to the listening device based on receiving the code from the listening device.

2. The first server of claim 1, where the frequency code includes inaudible frequencies to be emitted by the broadcasting device.

3. The first server of claim 1, where the second content supplements the first content.

4. The first server of claim 1, where the one or more processors are further to:
   store another data structure that associates the second content and the code;
   query the other data structure using the code received from the listening device; and
   retrieve the second content associated with the code based on querying the other data structure.

5. The first server of claim 1, where the frequency code is less than one second in length.

6. The first server of claim 1, where the different frequencies, the start frequency, and the end frequency are greater than 15 KHz.

7. A non-transitory computer-readable medium storing instructions, the instructions comprising:
   a plurality of instructions that, when executed by a processor of a first server, cause the processor to:
      receive a request, from a second server, to provide a frequency code file,
         the frequency code file identifying a frequency code to be played while a broadcasting device presents a first content,
         the frequency code including information identifying a start frequency indicating a start of the frequency code and information identifying an end frequency indicating an end of the frequency code, and
         the request being received with a second content from the second server,
            the second content being associated with the first content;
      generate, based on the request, a code associated with the second content,
         the code including one or more characters, and
         the code to be used to retrieve the second content;
      store the second content in association with the code;
      generate the frequency code file based on the one or more characters of the code and a data structure stored by the first server,
         the data structure storing different characters in association with different frequencies,
         each character, of the different characters, being associated with a respective frequency of the different frequencies,
         the start frequency and the end frequency each being different from the different frequencies associated with the different characters, and
         the start frequency and the end frequency being different than another start frequency and another end frequency,
            the other start frequency and the other end frequency being associated with another frequency code representing another second content;

send, to the second server, the frequency code file for the frequency code to be played by the broadcasting device while presenting the first content,
the second server providing the first content with the frequency code file to the broadcasting device,
the frequency code file including:
the start frequency,
the end frequency, and
the code to be used to retrieve the second content,
the broadcasting device to provide the frequency code while presenting the first content;
receive the code from a listening device that detected the frequency code provided by the broadcasting device; and
send, based on receiving the code from the listening device, the second content associated with the code to the listening device to be presented.

8. The non-transitory computer-readable medium of claim 7, where the frequency code file is an audio file.

9. The non-transitory computer-readable medium of claim 7, where the frequency code is less than one second in length.

10. The non-transitory computer-readable medium of claim 7, where the plurality of instructions, to send the frequency code file to the second server, cause the processor to:
send a plurality of frequency code files, to the second server, that identify frequency codes to be played by the broadcasting device while presenting a same first content,
the plurality of frequency code files including the frequency code file, and
the frequency codes including the frequency code.

11. The non-transitory computer-readable medium of claim 10,
where the plurality of frequency code files is associated with a plurality of second content, the plurality of second content including the second content, and
where the plurality of instructions, to send the second content to the listening device, cause the processor to:
send the plurality of second content to the listening device to be presented while the broadcasting device presents the same first content.

12. The non-transitory computer-readable medium of claim 7, where the different frequencies, the start frequency, and the end frequency are greater than 15 KHz.

13. The non-transitory computer-readable medium of claim 7, where the frequency code includes inaudible frequencies to be emitted by the broadcasting device.

14. The non-transitory computer-readable medium of claim 7, where the plurality of instructions further cause the processor to:
store another data structure that associates the second content and the code;
query the other data structure using the code received from the listening device; and
retrieve the second content associated with the code based on querying the other data structure.

15. A method comprising:
receiving, by a device, a request, from a server, to provide frequency code information identifying a frequency code,
the frequency code including information identifying frequencies to be emitted by a broadcasting device that presents a first content,
the frequency code including information identifying a start frequency indicating a start of the frequency code and information identifying an end frequency indicating an end of the frequency code, and
the request being received with a second content from the server,
the second content being associated with the first content;
generating, by the device and based on the request, a code associated with the second content,
the code including one or more characters, and
the code to be used to retrieve the second content;
storing, by the device, the second content and the code;
generating, by the device, the frequency code information based on the one or more characters, included in the code, and a data structure stored by the device,
the data structure storing different characters in association with different frequencies,
each character, of the different characters, being associated with a respective frequency of the different frequencies,
the start frequency and the end frequency each being different from the different frequencies associated with the different characters, and
the start frequency and the end frequency being different than another start frequency and another end frequency,
the other start frequency and the other end frequency being associated with another frequency code representing another second content;
providing, by the device and to the server, the frequency code information for the frequency code to be emitted by the broadcasting device,
the server providing the first content with the frequency code information for the frequency code to the broadcasting device,
the frequency code information including:
the start frequency,
the end frequency, and
the code to be used to retrieve the second content,
the broadcasting device to emit the frequency code while presenting the first content;
receiving, by the device, the code from a listening device that detected the frequency code emitted by the broadcasting device; and
providing, by the device, the second content associated with the code to the listening device based on receiving the code from the listening device.

16. The method of claim 15, where the frequency code includes inaudible frequencies to be emitted by the broadcasting device.

17. The method of claim 15, where the second content supplements the first content.

18. The method of claim 15, further comprising:
storing another data structure that associates the second content and the code;
querying the other data structure using the code received from the listening device; and
retrieving the second content associated with the code based on querying the other data structure.

19. The method of claim 15, where the different frequencies, the start frequency, and the end frequency are greater than 15 KHz.

20. The method of claim 15, where the frequency code is less than one second in length.

* * * * *